US006614126B1

United States Patent
Mitchell

(10) Patent No.: US 6,614,126 B1
(45) Date of Patent: Sep. 2, 2003

(54) INTEGRATED LIGHTING AND DATA COMMUNICATION APPARATUS

(75) Inventor: James P. Mitchell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 10/004,491

(22) Filed: Oct. 24, 2001

(51) Int. Cl.[7] .................................................. B60L 1/00
(52) U.S. Cl. ................... 307/9.1; 340/325.72; 362/259; 362/236; 362/231
(58) Field of Search ...................... 307/9.1; 340/825.72; 315/129, 29, 294, 297, 307, 308, 316, 317, 58, 291, 295; 701/1, 36; 455/3.01, 431; 244/118.5; 250/199; 359/110; 362/259, 236, 231

(56) References Cited

U.S. PATENT DOCUMENTS

| 4,313,208 A | * | 1/1982 | Kavenik | 348/776 |
| 5,424,859 A | * | 6/1995 | Uehara et al. | 359/152 |
| 5,758,951 A | * | 6/1998 | Haitz | 362/259 |
| 6,198,230 B1 | * | 3/2001 | Leeb et al. | 315/200 R |
| 6,203,180 B1 | * | 3/2001 | Fleischmann | 362/147 |

* cited by examiner

Primary Examiner—Brian Sircus
Assistant Examiner—Robert L DeBeradinis
(74) Attorney, Agent, or Firm—Nathan O. Jensen; Kyle Eppele

(57) ABSTRACT

A data communication apparatus comprising includes multiple white light emitting diodes or other sources of light which generate environmental lighting for a user of the data communication apparatus. The data communication apparatus also includes a data transmitting device positioned adjacent the white light emitting diodes, the data transmitting device configured to wirelessly transmit data signals to electronic devices used by the user. The data communication apparatus can also include a data receiving device for receiving wirelessly transmitted data signals from the electronic devices used by the user. The data communication device can be used, for example, in an aircraft cabin lighting system.

11 Claims, 5 Drawing Sheets

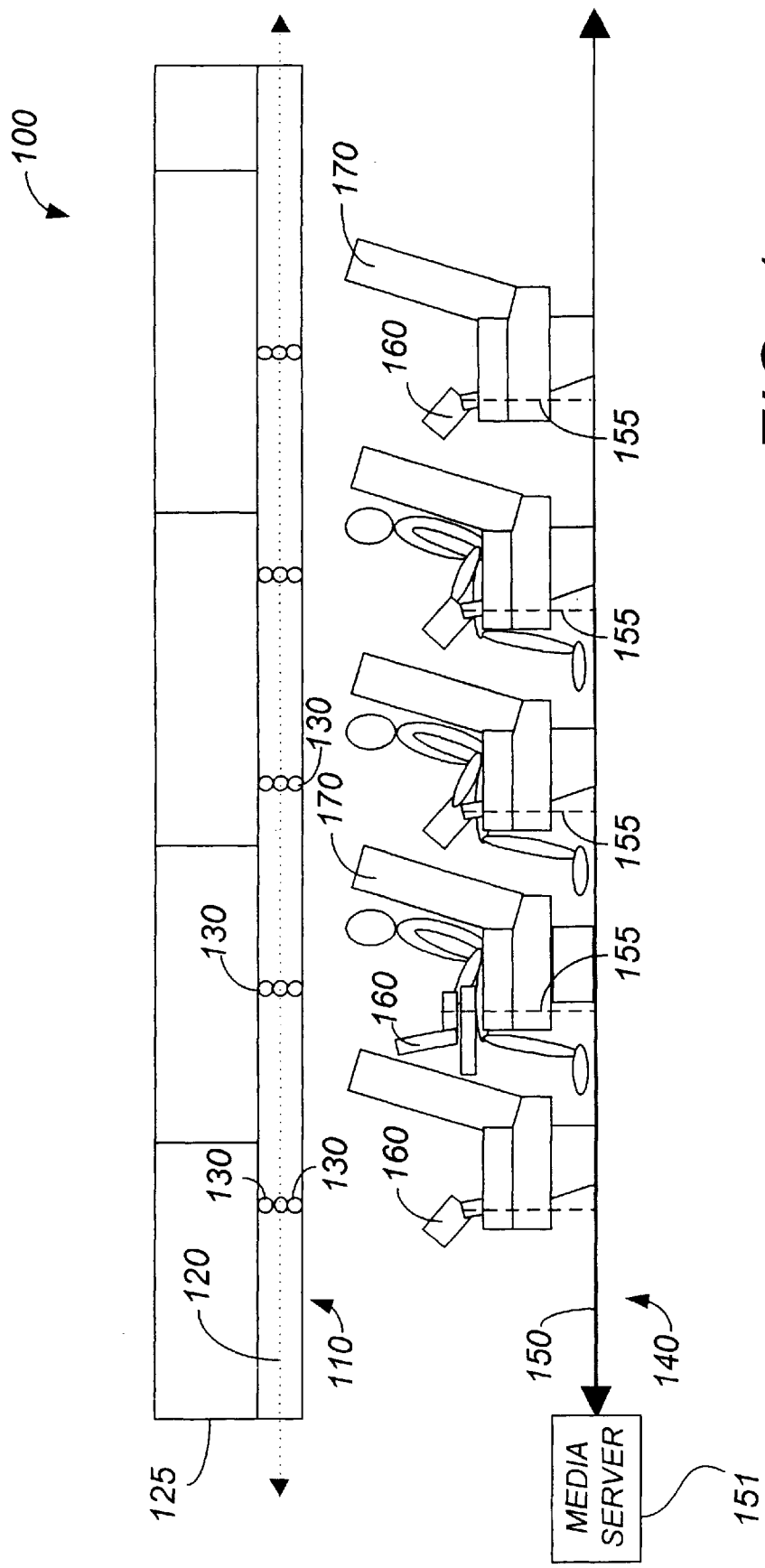
FIG. 1 *PRIOR ART*

INTEGRATED LIGHTING AND DATA COMMUNICATION APPARATUS

FIELD OF THE INVENTION

The present invention relates generally to wireless communication systems. More particularly, the present invention relates to wireless data links for use in aircraft for providing in-flight entertainment content and/or passenger personal communications, or for use in other environments.

BACKGROUND OF THE INVENTION

In many communications, entertainment, or other systems, providing data content and/or two-way communications with a user requires a significant communications infrastructure. When multiple users require independent data reception and/or two-way communications, this infrastructure becomes even more extensive. For example, in aircraft in-flight entertainment systems of the type which provide audio and/or video content to the passengers, it can be necessary to install an extensive data network in the aircraft in order to deliver the audio and/or video content to each of a large number of different passenger seating areas.

As in-flight entertainment systems become more advanced, the need for delivery of high bandwidth data to the passenger seating locations will continue to increase. For example, for individual passengers to be able to select different in-flight movies, music and/or entertainment content start times, additional data bandwidth will become increasingly important. Further, as the use of on-board telephones continues to increase, the need for high data bandwidth to specific passenger seat locations will be even more evident. Further, computer access to the internet or other computer networks in aircraft and other similar environments is becoming increasingly popular.

In the aircraft industry, it is very expensive to run a large number of data buses or communication lines to the large number of passenger seating locations. These problems are even greater in current aircraft passenger in-flight entertainment and telecommunication systems when it comes to service and maintenance. Generally, current aircraft passenger in-flight entertainment and telecommunications systems use significant amounts of wired infrastructure, making it costly to reconfigure and maintain. Telecommunication clients struggle with cords, wires, lack of guidance and aircraft noise. Further, while some of these problems are specific to the airline industry, others exist in a wide range of telecommunication system environments. Consequently, a telecommunications system which overcomes some or all of these difficulties would be a significant improvement in the art.

SUMMARY OF THE INVENTION

A data communication apparatus comprising includes multiple white light emitting diodes which generate environmental lighting for a user of the data communication apparatus. The data communication apparatus also includes a data transmitting device positioned adjacent the white light emitting diodes, the data transmitting device configured to wirelessly transmit data signals to electronic devices used by the user. The data communication apparatus can also include a data receiving device for receiving wirelessly transmitted data signals from the electronic devices used by the user. The data communication device can be used, for example, in an aircraft cabin lighting system.

BRIEF DESCRIPTION OF THE DRAWINGS

FIG. 1 is a diagrammatic illustration of a prior art aircraft in-flight entertainment and/or telecommunications system.

DETAILED DESCRIPTION OF AN ILLUSTRATIVE EMBODIMENT

Figures 2, 3:
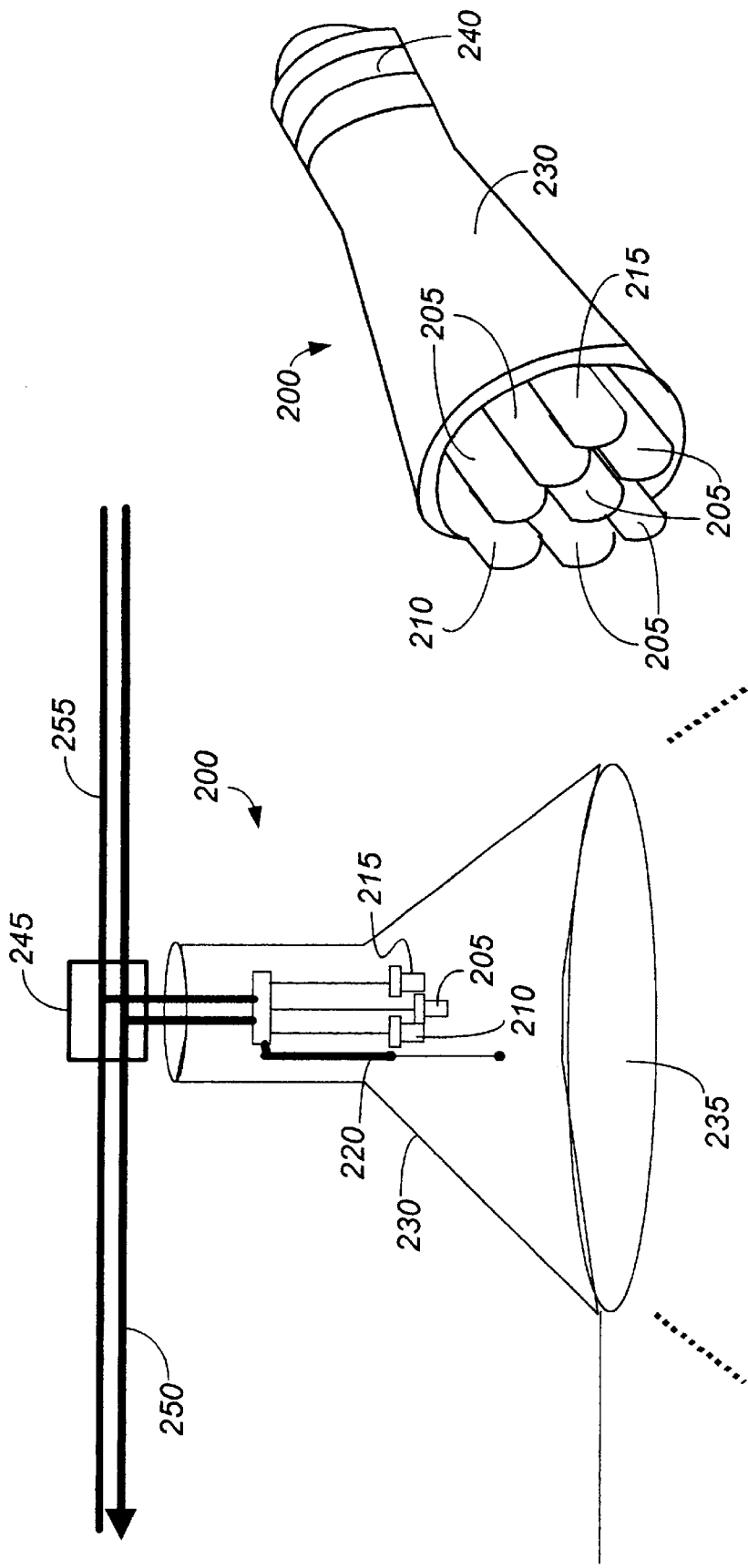
FIG. 2 is a diagrammatic side view of a data communication and lighting apparatus in accordance with some embodiments of the present invention.
FIG. 3 is a perspective view illustration of one more particular embodiment of the data communication and lighting apparatus shown in FIG. 2.

The present invention includes an integrated lighting and data communication apparatus which co-locates a lighting system with an overhead wireless data system. This invention can be used, for example, to combine aircraft lighting and in-flight-entertainment (IFE) systems into a single unit positioned above a passenger of the aircraft. This unique manner of combining two manufactured boxes which have conventionally separately housed lighting and IFE functions, provides the opportunity to achieve some or all of numerous benefits. For example, placing integrated lighting and data communication apparatus above the passengers (at locations of conventional lighting systems) provides good directivity in which both lighting and data beams are unobscured from above (at each seat or seat group).

An additional potential benefit in airline applications is that, when seat re-spacing is conducted by airline maintenance crews, the overhead lighting panels are easily regrouped for each seat on a one-to-one basis. In contrast, a more conventional approach of placing IFE boxes under the seats present the likely necessity for a major rewire—enough so that the entire wiring system for the aircraft is generally removed and replaced with a new cable taking hours of labor and time. With conventional IFE systems, airlines potentially loose large sums of money waiting for the last items to be installed and tested before returning to service. However, with the present invention, both systems may be housed as one, minimizing cost, as the lighting system and the light panel real-estate already exist. To upgrade, the airline simply installs a single unit—one box per seat group(s) serving both functions. Thus IFE comes at a reduced cost in comparison to two separate systems. The following discussion provides a detailed description of an illustrative embodiment of the invention.

FIG. 1 is a diagrammatic side view illustration of a portion of a passenger seating area of an aircraft 100. As illustrated in FIG. 1, a lighting system 110 and an in-flight entertainment and/or telecommunications systems 140 are installed on aircraft 100 to provide lighting and entertainment and/or telecommunication services to passengers located in seats or seating groups 170. Lighting system 110 includes electrical cables 120 routed through an overhead structure 125 for providing power to light sources 130. Light sources 130 are typically incandescent bulbs, but can be other types of light sources which provide light to the seating areas of individual seats or seat groups 170.

In-flight entertainment and/or telecommunications system (data communication system) 140 includes data cables or bus 150 and individual or personal electronic devices 160. Devices 160 can include, for example, liquid crystal displays (LCDs) for displaying in-flight video, audio devices such as headphones, lap-top or palm-sized personal computers, and wired or wireless telephones, to name a few. As is shown diagrammatically in FIG. 1 with dashed lines, personal electronic devices 160.at each seat or seat group 170 are hard-wired to media server 161 via data bus 150 in order to facilitate delivery of video or audio content to the personal electronic devices, or to facilitate two-way communications such as in-flight internet access or telephone services. As discussed previously, the significant wiring infrastructure associated with separate lighting system 110 and communication system 140 has numerous disadvantages including high cost, complexity, space requirements, and difficulty in reconfiguring and maintaining.

FIG. 2 is a diagrammatic side view illustration of a data communication and lighting apparatus 200 in accordance with embodiments of the present invention. Data communication and lighting apparatus 200 can be used in place of lighting system 110 (FIG. 1) used conventionally, with appropriate routing of data communication lines and re-fitting of electrical connectors to handle data transfer as well as power. Data communication and lighting apparatus (hereafter data communication apparatus) 200 includes a cluster 205 of white light emitting diodes (LEDs) which emit white light in the visible portion of the UV spectrum. The cluster 205 of white LEDs generate environmental lighting for use, for example, by a passenger of an aircraft or a user of data communication apparatus 200 in other environments. White LED lighting can provide low power, high intensity lighting with a number of beneficial attributes. For example, white LED lamps are typically extremely long lasting, with an average life expectancy of 100,000 hours or more. The low power aspects of the white LEDs provides major power savings, as well as a considerable reduction in the heat generated as compared to traditional incandescent lamps. The cooler aspects of the white LEDs are also beneficial in allowing communications components of apparatus 200 and 160 (discussed below in greater detail) to operate with less interference. Generally, efficient white lighting sources allow improved immunity from incandescent and standard fluorescent lighting noise (powered by alternating current power systems).

Data communication apparatus 200 also includes a data transmitting device 210 positioned adjacent the cluster of white LEDs 205. The data transmitting device 210 is configured to wirelessly transmit data signals to electronic devices used by a user, such as a passenger of an aircraft for example. In some embodiments, the data transmitting device is an infrared (IR) transmitter which can be implemented using other types of LEDs. However, transmitting device 210 can be other than IR in other embodiments. In some embodiments, data transmitting device 210 is a transmitting device of the type known in the art which transmits data using ultraviolet light. In yet other embodiments, the transmitting device transmits data using low power electromagnetic waves, for example in the radio frequency (RF) range, with the power being low enough to limit wireless data transfer to a distance of no more than about 1 meter, and thereby limiting interference with other aircraft systems. In yet other embodiments, communication apparatus 200 includes both data transmitting device 210 and a separate RF receiver and/or transmitter 220 for providing data communication with electronic devices used by a user of data communication apparatus 200.

In some embodiments, also included in data communication apparatus 200 is a data receiving device 215 positioned adjacent the cluster of white LEDs 205 and the data transmitting device 210. The data receiving device is configured to receive wirelessly transmitted data signals from the electronic devices used by the user. Frequently, data receiving device 215 will be of a type similar to data transmitting device 210 for communication with a particular electronic device using a particular communications technology. For example, if data transmitting device 210 is an IR transmitter, the receiving device 215 can be an IR receiver. However, devices 210 and 215 need not utilize the same communications technology in all embodiments. Further, inclusion of data transmitting and receiving devices 210 and 215 with RF receiver and/or transmitter 220 provides the opportunity for a wider range of communication link types, but is not required in all embodiments.

In some embodiments, data communication apparatus 200 is contained within a single housing 230. The housing can be, for example, a light bulb housing optionally including a lens 235. This helps to facilitate use of data communication apparatus 200 in place of conventional light bulbs in a conventional lighting system (with appropriate wiring changes).

Referring for the moment to FIG. 3, illustrated diagrammatically in a perspective view is one embodiment of a data communication apparatus 200 including a cluster 205 of white LEDs, a data transmitting device 210 and a data receiving device 215. An RF transmitter/receiver 220 is not shown in the embodiment of FIG. 3, but can be included if desired. In this embodiment shown in FIG. 3, data transmitting device 210 and data receiving device 215 are of a technology similar to white LEDs 205. For example, data transmitting device 210 can be an LED which transmits data using a different spectrum, and data receiving device 215 can be a photodiode or similar device of the type which provides electrical signals in response to reception of transmitted data signals in that spectrum. Also shown in FIG. 3 is a connector 240 attached to housing 230 and electrically coupled to the cluster of white LEDs 205, the data transmitting device 210 and the data receiving device 215 to provide power to all devices, to provide electrical data signals to the data transmitting device for wireless transmission to the electrical devices used by the user, and to carry electrical data signals received by receiving device 215.

Referring for the moment back to FIG. 2, it is shown that data communication device 200 is coupled through a network node high-speed time division multiple access (TDMA) data router 245. Network node data router 245 connects the transmitting and receiving devices of communication apparatus 200. Network node data router 245 connects data communication apparatus 200 to a coaxial or fiber (or other types) of data communication bus or line(s) 250 for sending and receiving digital data signals for transmission to or reception by apparatus 200. In one embodiment, the data communication line 250 are fiber optic communication lines of the type which can accommodate transmission of at least 100 Mbps of data. Network node data router 245 can also be configured to connect data communication apparatus 200 to a power line 255 for powering the data communication device.

While in one embodiment device 245 is described as a network node high-speed TDMA data router, device 245 can in other embodiments be any device which facilitates communications by or with communication apparatus 200 using data line 250. For example, device 245 can be a digital tuner, Ethernet and/or high-speed video data chip set. Also, device 245 can provide a internet protocol (IP) address for communication devices.

Figure 4:
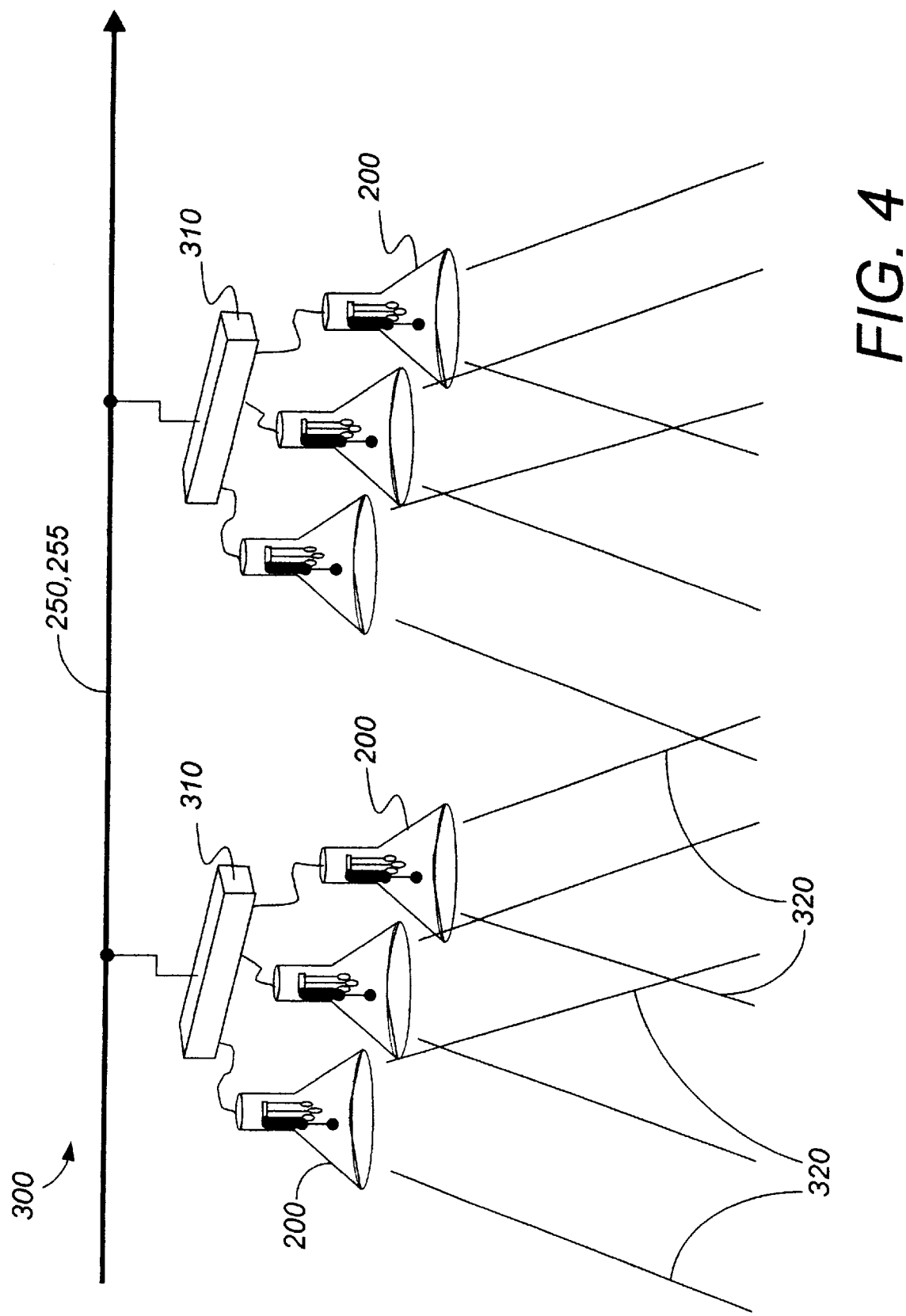
FIG. 4 is a diagrammatic illustration of multiple data communication apparatus, as shown in FIGS. 2 and 3, used for example in conjunction with seat groups of an aircraft.

FIG. 4 is a diagrammatic illustration of multiple data communication apparatus 200, in sets of three in this example corresponding to three adjacent seats in an aircraft, providing a digital broadcast backbone for a communication system such as an in-flight entertainment and/or communication system. As shown, each data communication apparatus 200 is connected to a digital tuner/receiver and video demux 310 which is in turn connected to data communication lines or bus 250 to form a system 300.

In one embodiment, communication lines 250 form a 100 Mbps or faster digital broadcast backbone for carrying digital content such as a video, audio, or other data. Each of data communication apparatus 200 generates a high-speed data transmission beam 320 to a particular area, for example corresponding to a seat client in an aircraft. These "beams" provide individual data communications to/with each individual user of the system 300. In one embodiment, each beam 320 provides digital data communication of between 300 Kbps and 4 Mbps.

Figure 5:
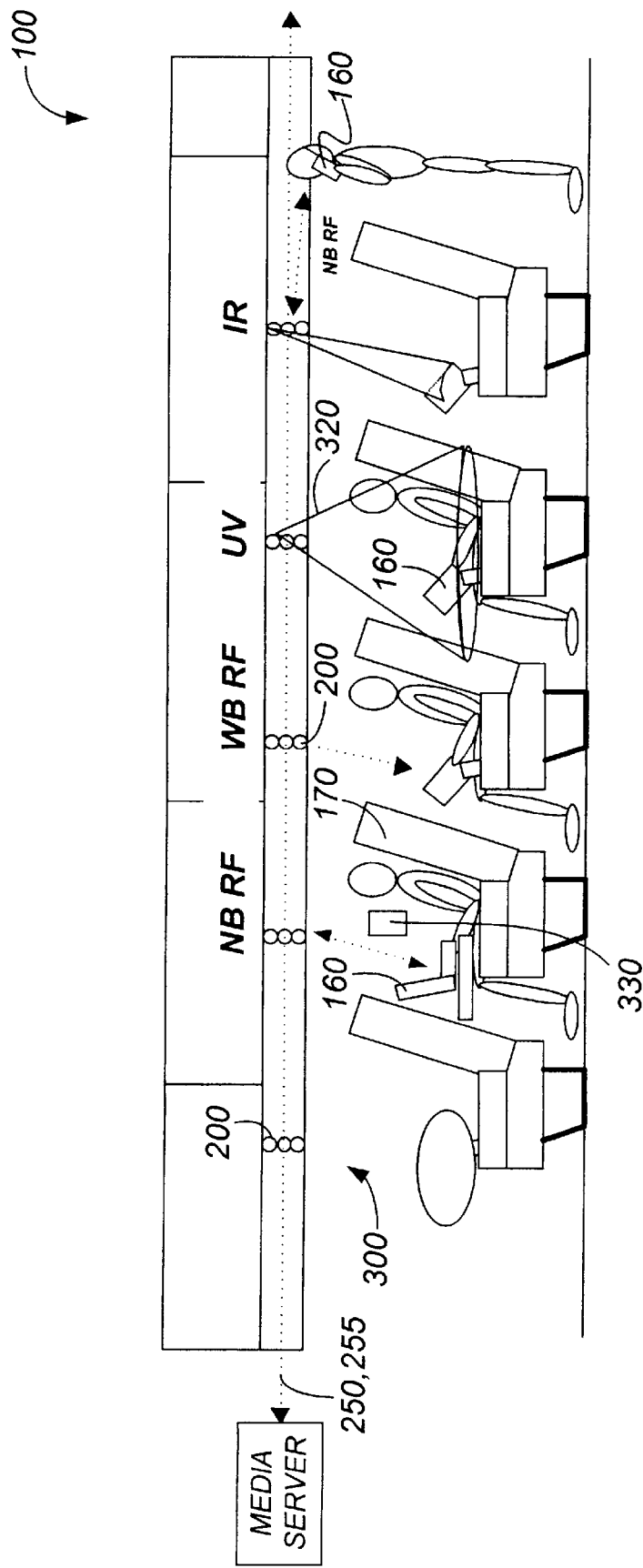
FIG. 5 is a diagrammatic side view, similar to FIG. 1, which illustrates an in-flight entertainment and/or telecommunications systems utilizing the data communication and lighting apparatus shown in FIGS. 2–4.

FIG. 5 is an illustration of a portion of aircraft 100 similar to that shown in prior art FIG. 1. However, as shown in FIG. 5, an aircraft cabin communication system 300 is included in place of lighting system 110 and in-flight entertainment and/or telecommunication system 140. As shown in FIG. 5, individual communication apparatus 200 located in the position of conventional incandescent bulbs in an aircraft are used to provide both lighting and digital communication to and/or with personal electronic devices 160 for a seat or a seating group 170. This eliminates the need for separate routing of wires for in-flight entertainment and/or communication system 140 shown in FIG. 1. Individual communication apparatus 200 are connected, via data communication lines or bus 250, to a media server 151 which controls delivery of data to the passengers.

Also illustrated in FIG. 5 is remote control 330 which provides the passenger a mechanism for controlling lighting, delivery of IFE data content and delivery of other information through the communication system 300. The remote control can be a wireless remote control which controls the system by wirelessly transmitting control signals to data router 245 (FIG. 2), or to a data transmission controller 400 (discussed below with reference to FIG. 6), positioned near communication apparatus 200. In the alternative, the remote control can wirelessly transmit the control signals to a controller positioned within a personal electronic device (for example controller 415 discussed below with reference to FIG. 6) or integrated within the armrest or other portions of the passenger seats. In other embodiments, the remote control is not a wireless remote, but rather is hard wired to a controller in an personal electronic device. In these embodiments, the remote control can be connected to the controller with a cable which facilitates movement of the remote, or can be permanently attached to the passenger seats. In either of these types of embodiments, control signals generated by the remote can include address information so that a particular remote control only controls the lighting or data communications corresponding to one passenger seat.

As illustrated in FIG. 5, communication apparatus 200 can supply a data link for wireless phones. The wireless phone data link provided by communication apparatus 200 can be, for example, either IR or RF. If an IR data link is used, then regulatory issues (e.g. FAA, FCC, etc) are minimized.

Figure 6:
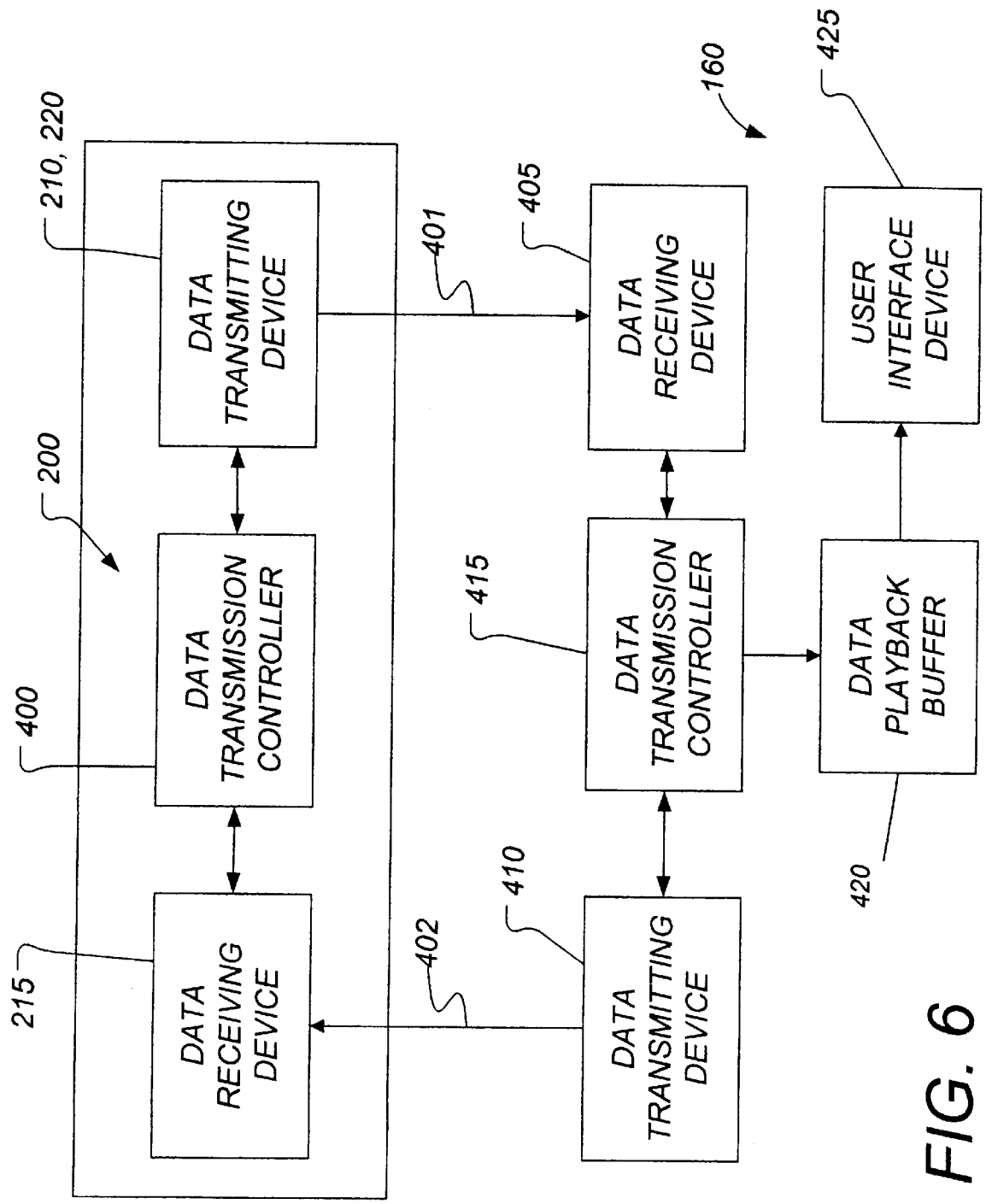
FIG. 6 is a block diagram illustrating additional features of an aircraft cabin communication system in accordance with the invention.

FIG. 6 is a block diagram illustration additional features of an aircraft cabin communication system, using a communication apparatus 200, in accordance with some embodiments of the invention. As shown in FIG. 6, a data transmitting device 210 or 220 of communication apparatus 200 transmits a data beam to a data receiving device 405 associated with personal electronic devices 160 used by a passenger. As illustrated in FIG. 6, in one embodiment the personal electronic device includes a user interface device 425, which can be an LCD or other type of display, for example. In the circuitry associated with the electronic device 160, a data transmission controller 415 is coupled to the data receiving device 405 and provides the data (from data beam 401) to a data playback buffer 420. Data playback buffer 420 provides the data to user interface device 425 in a time-delayed manner in order to minimize interruptions in services provided to the passenger resulting from temporary blockages or interference with data beam 401.

Data transmission controller 415 is also coupled to data transmitting device 410, and can be configured to control data transmitting device 410 in order to thereby provide in data beam 402 an confirmation of receipt of data in data beam 401, and/or to change IFE channels or lighting settings. In communication apparatus 200, the data receiving device 215 receives data in data beam 402. In the particular embodiment illustrated in FIG. 6, data communication device 200 also includes a data transmission controller 400 which is coupled to each of data receiving device 215 and data transmitting device 210 or 220 for controlling data transmission in beam 401. If data transmission controller 400 receives an indication in beam 402 that data transmission in beam 401 was not received due to a blockage or other interference, data transmission controller 400 controls data transmitting device 210 or 220 to repeat the relevant portions of the transmission in data beam 401.

The system illustrated in FIG. 6 provides numerous advantages in the wireless delivery of content to a passenger of the aircraft. First, by including data transmission controllers and a retry protocol, the likelihood of the data being successfully delivered to the passenger electronics is greatly increased. This allows operation when the passenger or some other objects temporarily blocks data beam 401. Further, data playback buffer 420 provides the unique ability at the passenger's seat (i.e., using a personal electronic device, IFE display, a network node, etc.) to delivery data in advance of playback to the user into a digital buffer. This buffer storage is regulated by the data delivery system to maintain a certain level equating to a guaranteed play time in the event that the beam does become blocked. The playback device continues to extract data/media based upon the remainder of the buffer content, until connection is re-established or until the buffer becomes exhausted. This protocol uniquely addresses data stream errors caused by typical cabin passenger movements or periods of time greater than those traditionally handled by Ethernet or packet based protocols.

Although the present invention has been described with reference to illustrative embodiments, workers skilled in the art will recognize that changes may be made in form and detail without departing from the spirit and scope of the invention. For example, the light sources used in the data communication apparatus of the present invention have been described as white LEDs, but can be other white light sources as well.

What is claimed is:

1. An aircraft cabin communications system comprising:
   a plurality of data communication devices positioned throughout a passenger cabin of an aircraft, each of the plurality of data communication devices comprising:

a source of white light which generates environmental lighting for a corresponding passenger of the aircraft; and a data transmitting device positioned adjacent the source of white light, the data transmitting device configured to wirelessly transmit data signals to electronic devices used by the corresponding passenger; and a data bus coupled to each of the plurality of data communication devices and carrying data signals for wireless transmission to the electronic devices used by corresponding passengers, wherein the data communication devices are disposed within overhead lighting panels.

2. The aircraft cabin communications system of claim 1, wherein each of the plurality of data communication devices further comprises a housing, wherein the source of while light and the data transmitting device of each data communication device are positioned inside the housing.

3. The aircraft cabin communications system of claim 2, wherein for each of the plurality of data communication devices, the housing is a light bulb housing.

4. The aircraft cabin communications system of claim 2, wherein the data transmitting device of each data communication device is an infrared transmitter.

5. The aircraft cabin communications system of claim 2, wherein the data transmitting device of each data communication device is an ultraviolet light transmitter.

6. The aircraft cabin communications system of claim 2, wherein the data transmitting device of each data communication device is an electromagnetic wave transmitter.

7. The aircraft cabin communications system of claim 6, wherein the data transmitting device of each data communication device is a radio frequency transmitter.

8. The aircraft cabin communications system of claim 2, wherein each data communication device further comprises a data receiving device positioned inside the housing adjacent the source of white light and the data transmitting device, the data receiving device configured to receive wirelessly transmitted data signals from the electronic devices used by the particular passenger.

9. The aircraft cabin communications system of claim 8, wherein each data communication device further comprises a connector attached to the housing and electrically coupled to the source of white light for providing power, the connector also electrically coupling the data transmitting device and the data receiving device to the data bus.

10. The aircraft cabin communications system of claim 8, wherein each data communication device further includes a data transmission controller coupled to the data receiving device and the data transmitting device, the data transmission controller configured to determine when data signals transmitted to the electronic devices used by the corresponding passenger are interfered with, and configured to control the data transmitting device to retransmit the data signals if it is determined that the data signals have been interfered with.

11. The aircraft cabin communications system of claim 10, and further comprising data playback buffers coupled to electronic devices used by the corresponding passengers, the data playback buffers receiving data transmitted from corresponding data communication devices and storing the data for time delayed playback to the corresponding passengers.

* * * * *